Figure 1:
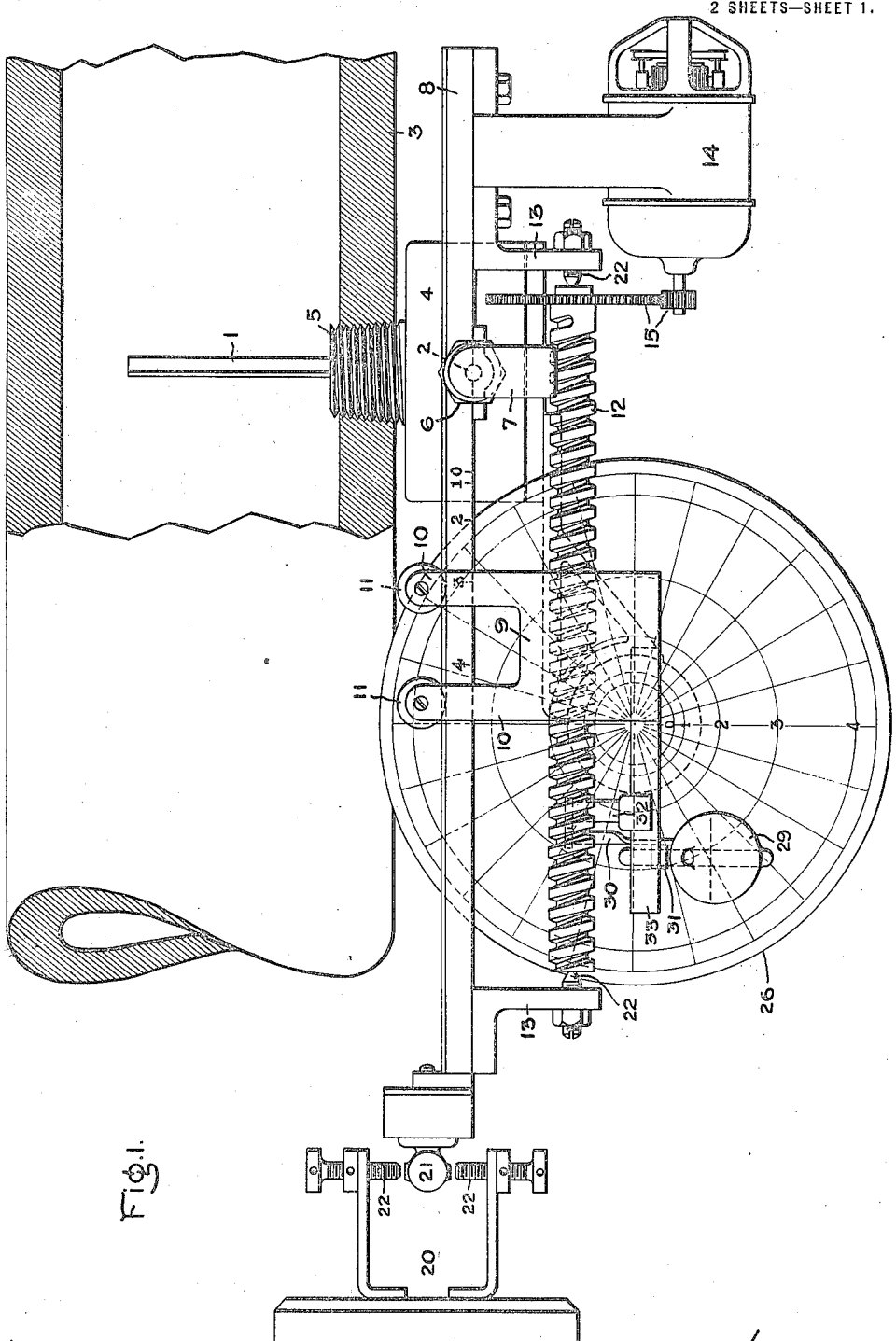

H. H. MAPELSDEN.
METER APPARATUS.
APPLICATION FILED OCT. 1, 1913.

1,208,602.

Patented Dec. 12, 1916.
2 SHEETS—SHEET 1.

Witnesses:

Inventor:
Harold H. Mapelsden,
by
His Attorney.

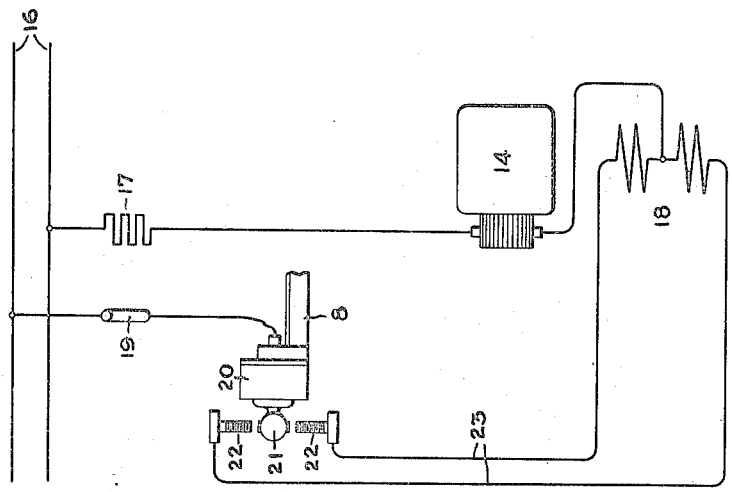
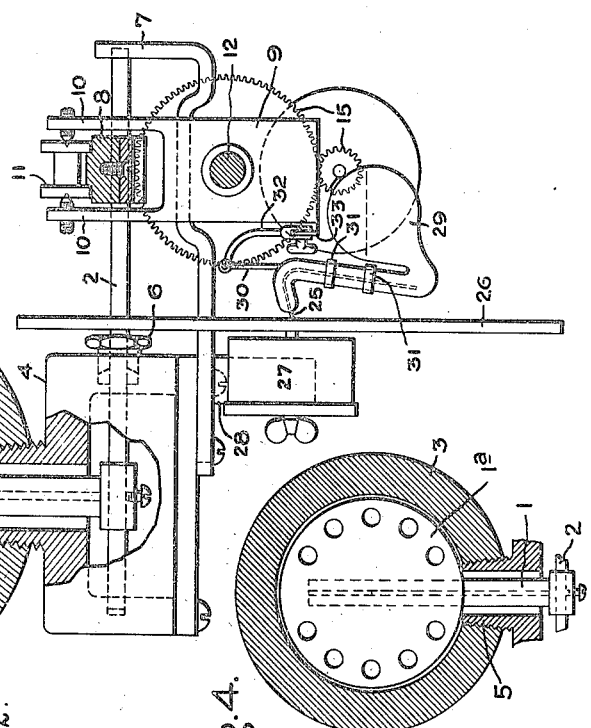

UNITED STATES PATENT OFFICE.

HAROLD H. MAPELSDEN, OF SCHENECTADY, NEW YORK, ASSIGNOR TO GENERAL ELECTRIC COMPANY, A CORPORATION OF NEW YORK.

METER APPARATUS.

1,208,602.   Specification of Letters Patent.   Patented Dec. 12, 1916.

Application filed October 1, 1913. Serial No. 792,870.

*To all whom it may concern:*

Be it known that I, HAROLD H. MAPELSDEN, a citizen of the United States, residing at Schenectady, county of Schenectady, State of New York, have invented certain new and useful Improvements in Meter Apparatus, of which the following is a specification.

My invention relates to meter apparatus for measuring the velocity or flow of fluids, and it affords novel means for this purpose whereby various practical advantages can be obtained, such advantages including accuracy and reliability of results; simplicity of operation; security of the apparatus against injury by freezing, and simplicity, ruggedness, and strength of construction.

Various advantages besides those above mentioned that can be secured in connection with my invention will appear from the following description of a particular embodiment, and its scope will be indicated in my claims.

In accordance with my invention, I employ a movable structure or member arranged in the path of the fluid to be metered so as to respond to the force of such fluid. With this member is associated means for counterbalancing the force exerted by the fluid on it for any velocity of the fluid and for indicating or measuring the magnitude of this force,—from which indication the velocity or flow of the fluid can be determined. The variation in the force exerted by such counterbalancing means necessary to make it equal to that of the fluid under varying conditions of velocity and flow is preferably brought about as the result of slight movement or displacement of the movable impact member but independently of any variation in said force arising from the mere fact of such displacement, the final outcome being the restoration of said member to the position which it occupied prior to the displacement.

I have hereinafter described in detail a simple and effective apparatus of the type above-mentioned in which the counterbalancing means is a weight shiftable along a lever or scale-beam, the position of the weight thereon indicating the magnitude of the force of the fluid on the movable member, and hence its velocity or flow, and means being associated with said weight for definitely indicating and making a continuous record of its position on the beam and hence of the velocity or flow. In this form of apparatus the inertia of the moving parts and their small range of movement tend to prevent over-response of the indicating mechanism to changes in the velocity of the fluid, and the former also acts to damp out sudden temporary fluctuations of velocity or pulsations in the flowing fluid. The fluid metered by the apparatus described may be air, steam, or other gas or vapor, or it may be water or other liquid. Moreover, while my invention extends to the mechanism described and its specific features and details, which are of importance on account of their special advantages, yet the invention is not confined to this mechanism or to such specific features or details, but can be otherwise carried out and embodied.

In the accompanying drawings, Figure 1 is a side view illustrating a flow meter apparatus such as above referred to, the conduit through which the fluid to be metered passes being partly in section. Fig. 2 is a view at right angles to Fig. 1, certain parts being broken away and removed in order that others may be more clearly visible. Fig. 3 is a diagram illustrating certain electrical connections. Fig. 4 is a detail view illustrating a modified form of one of the parts.

As shown in Figs. 1 and 2, the movable member 1 has the form of a long, narrow vane or T-section mounted on a shaft 2 so as to be capable of swinging with or against the flow of the fluid in the pipe or conduit 3. As shown, this vane 1 is of such small size in comparison with the cross-sectional area of the pipe 3 that it will not appreciably throttle the fluid or affect its flow or pressure, so that it will be affected only by the force of impact of the flowing fluid. The shaft 2 is arranged in a chamber structure or casing 4 having a threaded nipple 5 screwed into a hole in the wall of the pipe 3, the member 1 extending from the shaft 2 through the nipple 5 into the interior of said pipe 3 and the internal diameter of the nipple 5 being sufficient to afford the member 1 an ample though limited range of movement. The shaft 2 has bearings in the front and rear walls of the casing 4 (Fig. 2), and at the front it extends out through a stuffing-box 6 to an outboard bearing in a bracket 7 secured to the chamber structure 4.

The form, proportions, and arrangement of the member 1 shown are especially adapted for cases in which the fluid to be metered has a relatively high velocity (such as steam in the piping of a power plant, for example); and these proportions also allow the vane 1 to be introduced into the pipe 3 through the aperture that receives the nipple 5, without taking down or opening up the piping. In cases where the velocity is low, the member 1 may be made to present a relatively greater area to the flowing fluid in proportion to the size of the pipe, the weight of the mechanism, etc.—in which case it may be necessary to open up the pipe to introduce it,—and other modifications may be made.

The lever or scale-beam 8 which carries the counter-balance weight 9 is mounted on the shaft 2 between the stuffing-box 6 and the bracket 7. As shown, the weight 9 is suspended from the beam 8 by lugs 10 arranged in pairs at opposite sides of said beam, spool-like rollers 11 whose enlarged ends run at opposite sides of a ridge on top of the beam being mounted between conical pivots in the lugs of each pair and serving to reduce friction. The movement of the weight 9 along the beam 8 is effected by relay mechanism comprising a screw member 12 mounted beneath said beam between conical pivots in brackets 13 attached thereto and a reversible series wound electric motor 14 also attached to the lower side of said beam 8 at one end thereof and connected with said screw member 12 by gearing 15. When the weight 9 is to be moved, the motor 14 receives current from the line 16 (Fig. 3) through a direct connection to its armature including a resistance 17 and a connection to one or the other of its reversely wound field coils 18 including a hand switch 19 and a controller 20 associated with the lever 8. As shown, the controller 20 comprises a contact 21 mounted on the opposite end of the beam 8 from that on which the motor 14 is carried and a pair of co-operating adjustable stationary screw contacts 22 in brackets above and below said contact 21, these contacts 22 being connected with the field coils 18 by wires 23. In the drawing the range of movement of the contact 21 between the contacts 22 is very much greater than will usually be preferred, the object of this exaggeration being to make the drawing clearer; and it is also to be observed that in practice the beam 8 may be made much longer than shown in proportion to the dimensions of the other parts, if greater sensitiveness is desired.

The means for indicating and recording the position and movements of the weight 9 comprises an index and marking point or pen 25 attached to said weight and a circular disk 26 having its face graduated in a number of appropriately spaced circles or carrying a similarly graduated sheet of paper. To enable the point 25 to record the positions and movements of the weight 9 from time to time as well as to indicate its position at any given time, the disk 26 is driven by a clock-work 27 mounted on a bracket 28 attached to the chamber structure 4 and is also graduated with radial lines corresponding to appropriate intervals of time. As shown, the pen 25 is mounted at one end of the "pot-hook" bent neck of an ink flask or other vessel 29, the ink being carried up from the flask to the pen through a capillary passage in said neck. To insure that the pen 25 shall always bear against the marking surface of the disk 26 properly, the flask 29 is suspended by a link 30 secured to two collars 31 embracing its neck, the upper end of the link 30 being pivoted to a bracket arm 32 which is secured on an arm 33 projecting from the weight 9, so that the flask 29 can swing truly in the plane of the paper in Fig. 2, and the bracket arm 32 having a set screw 34 by which it can be set in the proper position on the arm whenever the machine requires readjustment to meet new conditions of use, or for any other reason.

While the scale on the disk 26 might be made to read in terms of units of force, it will be found practically more convenient to calibrate and graduate it to show feet per second velocity of the fluid through the conduit 3,—or, the internal cross-sectional area of the conduit being known, cubic feet per second flow. Or, if the density of the fluid in the conduit 3 is reasonably constant (which in the case of elastic fluid such as air or steam means of reasonably constant pressure and quality or condition) the scale can be made to read directly in cubic feet per minute for air flow, or in pounds per hour or boiler horse-power for steam or water flow. If desired, means for indicating the position of the weight 9 additional to the scale on the disk 26 may be provided by marking or mounting an appropriately graduated scale on the front edge of the beam 8, as shown.

The operation of the apparatus is as follows:—So long as the position of the weight 9 on the beam or lever 8 corresponds with the velocity or flow of the fluid in the conduit 3, the vane 1 remains substantially perpendicular to the conduit, and the contact 21 does not engage with either of the contacts 22. If the velocity or flow of fluid in the conduit 3 diminishes so that its force of impact on the member 1 is less, the left-hand end of the beam 8 descends, the contact 21 and the lower contact 22 come into engagement, and the motor 14 operates through the screw member 12 to shift the weight 9 to the right until its position corresponds with the changed velocity or flow in the conduit 3, whereupon the beam 8 rises, the contacts 21 and 22 are disengaged, and the motor comes to rest. Similarly, if the velocity or flow of the fluid in the conduit 3 increases, the left hand end of the beam 8 is caused to rise so as to bring the contact 21 into engagement with the upper contact 22 and the motor 14 is brought into action to shift the weight 9 to the left an amount corresponding to the increased velocity or flow.

Fig. 4 shows a modified form of movable impact member that is especially adapted for cases where the velocity of the fluid to be metered is unusually low,—as, for example, where the pipe employed is much larger for its intended service than good practice would require. As here shown, the movable part 1 of Figs. 1 and 2 carries a perforated metal disk 1ª having a diameter a little less than that of the pipe 3. By reason of the holes in it this disk 1ª can be made to present a greater area for the impact of the flowing fluid than the part 1 alone without material interference with the flow of the fluid, so as to secure a greater impact effect and a better correspondence between this effect and the average velocity and flow at different points in the cross section of the pipe; or, as shown, it may even be so large in comparison with the area that would otherwise be available for the flow of the fluid past the point where it is located as to throttle the fluid, so that there will be a slight but appreciable difference in static pressure between its two sides which will reinforce the impact force on the member 1 due to the velocity of the fluid. The result will in any case be that for a given variation in the velocity and flow the variation of the total force exerted on the movable member by the flowing fluid and the corresponding movement of the weight 9 will be greater than with the member 1 alone, so that the meter will be easier to read and more accurate in its indications. For varying conditions or velocities of the fluid the holes in the disk 1ª may be diminished or increased in number or size, or even dispensed with, and the disk itself may be made larger or smaller in comparison with the bore of the pipe 3 than would ordinarily be preferred.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a conduit through which a fluid to be metered flows, of a member in the conduit against which the fluid flows tending to move the same, a scale beam or lever connected to said member, a counterweight adjustable along said beam or lever for counterbalancing the force exerted by the fluid on said member, and means controlled by a slight movement of said member to automatically adjust the position of the counterweight whereby said member is held in a substantially fixed position in the conduit, and means for indicating the position of said counterweight on the beam.

2. An apparatus for measuring the velocity or flow of fluid comprising a movable member in the path of the fluid, a scale beam or lever rigidly connected to said member, a sliding counterweight on said beam for counterbalancing the force of the fluid on said member, and means responsive to movement of said member for automatically shifting said counterweight along said beam so as to bring said movable member back to its initial position.

3. An apparatus for measuring the velocity or flow of fluid comprising a casing having a nipple adapted to be inserted in the conduit through which passes the fluid to be metered, a vane pivoted in said casing and extending through said nipple so as to be exposed to the fluid in the conduit when the nipple is in place, means operatively connected with said vane for counterbalancing the force exerted by the flowing fluid thereon, and means for indicating the magnitude of the force exerted by said counterbalancing means and the velocity or flow.

4. An apparatus for measuring the velocity or flow of fluid comprising a movable member in the path of the fluid, means for counterbalancing the force exerted by the fluid on said member, means actuated by the movement of said member resulting from variation in said force for varying and adjusting the force exerted by said counterbalancing means to compensate for variation in the velocity or flow of the fluid and maintain said member in its initial position, and means for indicating the magnitude of the force exerted by said counter-balancing means and the velocity or flow.

5. An apparatus for measuring the velocity or flow of fluid comprising a movable member in the path of the fluid whose area is so large in comparison with that otherwise available for the flow of the fluid past the point where it is located that it causes throttling of the fluid, means for counterbalancing the force exerted by the fluid on said member, means actuated by movement of said member resulting from variation in said force for varying and adjusting the force exerted by said counterbalancing means to compensate for such variation in the velocity or flow of the fluid and maintain said member in its initial position, and means for indicating the magnitude of the force exerted by said counterbalancing means and hence the velocity or flow.

6. An apparatus for measuring the velocity or flow of fluid comprising a movable member in the path of the fluid, a scale-beam or lever connected with said member, a weight on said beam for counterbalancing the force exerted by the fluid on said member, means including a relay controlled by movement of said beam for shifting said weight along the same to compensate for variation in the velocity or flow and so restore said beam to the position which it occupied prior to such variation and put the relay out of operation, and means for indicating the position of said weight on said beam and the velocity or flow of the fluid.

7. An apparatus for measuring the velocity or flow of fluid comprising a movable member in the path of the fluid, a scale-beam or lever connected with said member, a shiftable weight on said beam for counterbalancing the force of impact of the fluid on said member, a screw member arranged on said beam and in engagement with said weight for shifting it along said beam, a motor also mounted on said beam for rotating said screw member, contact means carried by said lever, and stationary contact means coöperating with said contact means on said beam and connected with the controlling mechanism of said motor, so that by the movement of said beam resulting from variation in the velocity or flow of the fluid said motor shall be caused to rotate said screw member to shift said weight along said beam so as to compensate for such variation and cause disengagement of said contact means carried by said lever and said stationary contact means, and means for indicating the position of said counterweight on said beam and hence the velocity or flow of the fluid.

8. The combination with a conduit through which a fluid to be metered flows, of a member in the conduit against which the fluid flows tending to move the same, means for counterbalancing the force exerted by the fluid on said member and tending to maintain said member in a fixed position in the conduit, and means controlled by a slight movement of said member to automatically adjust said counterbalancing means.

9. The combination with a conduit through which a fluid to be metered flows, of a member pivoted in the conduit against which the fluid flows tending to move the same, means for counterbalancing the force exerted by the fluid on said member and tending to maintain said member in a fixed position in the conduit, means controlled by a slight movement of said member to automatically adjust said counterbalancing means, and means for indicating the value of the force exerted by said counterbalancing means.

In witness whereof, I have hereunto set my hand this 29th day of September, 1913.

HAROLD H. MAPELSDEN.

Witnesses:
    BENJAMIN B. HULL,
    HELEN ORFORD.